United States Patent
Groh

(10) Patent No.: US 11,580,653 B2
(45) Date of Patent: Feb. 14, 2023

(54) METHOD AND DEVICE FOR ASCERTAINING A DEPTH INFORMATION IMAGE FROM AN INPUT IMAGE

(71) Applicant: Robert Bosch GmbH, Stuttgart (DE)

(72) Inventor: Konrad Groh, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 17/040,595

(22) PCT Filed: Apr. 10, 2019

(86) PCT No.: PCT/EP2019/059087
§ 371 (c)(1),
(2) Date: Sep. 23, 2020

(87) PCT Pub. No.: WO2019/211068
PCT Pub. Date: Nov. 7, 2019

(65) Prior Publication Data
US 2021/0042946 A1 Feb. 11, 2021

(30) Foreign Application Priority Data

May 3, 2018 (DE) .......................... 102018206848.8

(51) Int. Cl.
*G06T 7/00* (2017.01)
*G06T 7/50* (2017.01)
*B60W 60/00* (2020.01)

(52) U.S. Cl.
CPC ............. *G06T 7/50* (2017.01); *B60W 60/001* (2020.02); *G06T 2207/20081* (2013.01); *G06T 2207/20084* (2013.01); *G06T 2207/30232* (2013.01)

(58) Field of Classification Search
CPC ............. G06T 7/50; G06T 2207/20081; G06T 2207/20084; G06T 2207/30232; B60W 60/001; G06N 3/0454
See application file for complete search history.

(56) References Cited

U.S. PATENT DOCUMENTS

2017/0206434 A1* 7/2017 Nariyambut Murali .....................
G06V 10/454
2018/0059679 A1 3/2018 Taimouri et al.
(Continued)

FOREIGN PATENT DOCUMENTS

| GB | 2538847 A | 11/2016 |
|---|---|---|
| WO | 2018052875 A1 | 3/2018 |

OTHER PUBLICATIONS

International Search Report for PCT/EP2019/059087, dated Jul. 12, 2019.
(Continued)

*Primary Examiner* — Ping Y Hsieh
(74) *Attorney, Agent, or Firm* — Norton Rose Fulbright US LLP; Gerard Messina

(57) ABSTRACT

A method for ascertaining a depth information image for an input image. The input image is processed using a convolutional neural network, which includes multiple layers that sequentially process the input image, and each converts an input feature map into an output feature map. At least one of the layers is a depth map layer, the depth information image being ascertained as a function of a depth map layer. In the depth map layer, an input feature map of the depth map layer is convoluted with multiple scaling filters to obtain respective scaling maps, the multiple scaling maps are compared pixel by pixel to generate a respective output feature map in which each pixel corresponds to a corresponding pixel from a selected one of the scaling maps.

11 Claims, 5 Drawing Sheets

(56) References Cited

U.S. PATENT DOCUMENTS

| | | | | |
|---|---|---|---|---|
| 2019/0147621 A1* | 5/2019 | Alesiani | .................... | G06T 7/73 382/190 |
| 2020/0005151 A1* | 1/2020 | Jiang | ........................ | G06N 3/04 |
| 2022/0148328 A1* | 5/2022 | Ye | .......................... | G06V 10/24 |

OTHER PUBLICATIONS

Chen, Weifeng, et al., "Single-Image Depth Perception in the Wild," Advances in Neutral Information Processing Systems, 2016, pp. 1-9.

Szegedy, Christian, et al., "Going Deeper With Convolutions," Proceedings of the IEEE Conference On Computer Vision and Pattern Recognition, 2015, pp. 1-9.

Yin Xiaochuan et al. "Scale Recovery for Monocular Visual Odometry Using Depth Estimated With Deep Convolutional Neural Fields," IEEE International Conference On Computer Vision (ICCV), IEEE, 2017, pp. 5871-5879. XP033283468.

Dan Xu et al., "Monocular Depth Estimation Using Multi-Scale Continuous CRFS as Sequential Deep Networks," Cornell University Library, 201 Olin Library Cornell University, 2018, pp. 1-15. XP080866404.

Eigen David et al., "Predicting Depth, Surface Normals and Semantic Labels With a Common Multi-Scale Convolutional Architecture", 2015 IEEE International Conference On Computer Vision (ICCV), IEEE, 2015, pp. 2650-2658. XP032866609.

Eigen David et al., "Depth Map Prediction From a Single Image Using a Multi-Scale Deep Network", Dept. of Computer Science, Courant Institute, NYU, 2014, pp. 1-9. XP055566498.

Hyeonwoo Noh et al., "Learning Deconvolution Network for Semantic Segmentation," Computer Vision and Pattern Recognition, Cornell University, 2015, pp. 1-10. https://arxiv.org/abs/1505.04366.

* cited by examiner

METHOD AND DEVICE FOR ASCERTAINING A DEPTH INFORMATION IMAGE FROM AN INPUT IMAGE

FIELD

The present invention relates to a method for image processing, in particular a method for ascertaining a piece of depth information from a provided image. Moreover, the present invention relates to a method for implementing functions of a technical system, in particular a robot, a vehicle, a tool, or a work machine, the functions being carried out as a function of a depth information image of the surroundings, or for controlling vehicle functions based on a depth information image.

BACKGROUND INFORMATION

Conventional functions of a technical system, in particular a robot, a vehicle, a tool, or a work machine, may be carried out as a function of a depth information image of the surroundings. For example, autonomous or semiautonomous vehicle functions, controlled by vehicles or external devices, are based on the reliable recognition of open space, vehicles, and humans or other objects in the surroundings of the motor vehicle. The detection of images in the surroundings with the aid of one or multiple cameras or other image detection devices is a fundamental requirement for implementing such a driving function in a motor vehicle.

The detected camera images are suitably evaluated, for example to segment the vehicle surroundings or recognize objects in the vehicle surroundings. Ascertaining a piece of depth information for the individual pixels or image objects of the detected images is extremely important. The depth information allows or simplifies, among other things, the association of image areas with individual objects, which is advantageous for a reliable segmentation of the image to be examined.

Thus far, methods for creating such depth information images, i.e., images provided with depth information or images that correspond to a depth map and indicate the depth of each pixel of a reference image, have generally utilized stereocameras for detecting stereoimages. By identifying features in the recorded scene, distances of the detected features may be ascertained based on image differences between the two stereoimages, and a depth map may be created from same.

Ascertaining depth information images based on an input image that is not stereoscopically detected with the aid of a monocamera has thus far not been known or reliably implemented.

SUMMARY

According to the present invention, a method for ascertaining a depth information image from an input image, a device, and an image processing system are provided.

Example embodiments of the present invention are described herein.

According to a first aspect of the present invention, a method for ascertaining a depth information image for an input image is provided. In accordance with an example embodiment of the present invention, the input image is processed with the aid of a convolutional neural network, the convolutional neural network including multiple layers that sequentially process the input image and in each case convert an input feature map into an output feature map, one of the layers being designed as a depth map layer, the depth information image being ascertained as a function of a depth map layer, in the depth map layer an input feature map of the depth map layer being convoluted with multiple scaling filters to obtain respective scaling maps, the multiple scaling maps being compared pixel by pixel in order to generate a respective output feature map in which each pixel corresponds to a corresponding pixel from a selected one of the scaling maps, a scaling feature map being generated by associating each pixel of the scaling feature map with a piece of information that indicates the scaling map from which the pixel of the output feature map is selected;

the depth information image corresponding to the scaling feature map or being determined as a function of the scaling feature map.

Furthermore, the selected scaling map may correspond to the scaling map that contains the largest pixel value for the particular pixel.

The above example method uses feature recognition in various scalings that are predefined by the scaling filters. Thus, by evaluating the different scaling maps that are obtained based on the scaling filters, and that are associated with the corresponding different scalings, the size of a feature that occurs in the image to be examined may be recognized. For certain objects to be recognized, the size of the feature then contains information concerning the distance of the object, belonging to the feature, from the camera that detects the image. Thus, by applying scaling filters of various scalings, a certain object may be identified in each case by at least one of the scaling filters, regardless of its distance from the detecting camera. The above method now utilizes the information, concerning which of the scaling filters was crucial for identifying the object, in order to estimate therefrom a distance from the object in question.

When a channel of an input image is convoluted by one or multiple layers of a convolutional neural network, using various scaling filters (kernels), this results in scaling maps that are linked for an output feature map in a subsequent max pooling step. The max pooling step corresponds to a maximum selection of the pixel values that is applied pixel by pixel, the particular maximum value of pixel values of the scaling maps that are associated with the identical pixels being entered into the output feature map.

At the same time, a piece of scaling information that indicates the scaling filter that has resulted in the maximum pixel value is entered into a scaling feature map for each pixel of the output feature map. Scaling feature maps are thus ascertained for the individual channels of the input feature map of the one or multiple computation layers of the convolutional neural network. A depth information image for the image to be examined may be indicated as a function of the one or multiple scaling feature maps thus determined.

The above example method has the advantage that a piece of depth information for the features depicted in the image may be ascertained from a simple image, i.e., that is not stereoscopically present. The depth information results from a scaling that is associated with the scaling filter that best recognizes the feature indicated by the scaling filter.

In addition, the scaling filters may be determined from a filter kernel of the trained convolutional neural network by downsampling.

It may be provided that the convolutional neural network includes multiple depth map layers for ascertaining multiple scaling feature maps, the depth information image being ascertained from the multiple scaling feature maps with the aid of a further neural network.

Furthermore, the multiple scaling maps may be compared pixel-by-pixel in a combining process in order to also obtain from the particular maximum pixel values the output feature map, which is used as an input feature map of a subsequent computation of a further layer of the convolutional neural network, or to obtain an output image.

Moreover, the depth information image may be ascertained from the multiple scaling feature maps and one or multiple output feature maps of one or multiple of the layers of the neural network, and/or of an output image of the neural network.

It may be provided that the neural network generates an output image, at least one of the layers generating an output feature map and/or the output image as a function of one or multiple of the scaling feature maps, for this purpose in particular the one or multiple of the scaling feature maps of the input feature map supplied to the layer in question being added.

According to one specific embodiment of the present invention, the output image and the depth information image may be processed together in a downstream additional neural network.

According to a further aspect of the present invention, a device for ascertaining a depth information image for an input image is provided for controlling vehicle functions in particular as a function of the depth information image. In accordance with an example embodiment of the present invention, the input image is processed with the aid of a convolutional neural network, the convolutional neural network including multiple layers that sequentially process the input image and in each case convert an input feature map into an output feature map, at least one of the layers being designed as a depth map layer, the depth information image being ascertained as a function of a depth map layer, for the at least one depth map layer the device being designed to:
- convolute an input feature map of the depth map layer in question with multiple scaling filters in order to obtain respective scaling maps,
- compare the multiple scaling maps pixel by pixel in order to generate a respective output feature map in which each pixel corresponds to a corresponding pixel from a selected one of the scaling maps,
- generate a scaling feature map by associating each pixel of the scaling feature map with a piece of information that indicates the scaling map from which the pixel of the output feature map is selected;

the depth information image corresponding to the scaling feature map or being determined as a function of the scaling feature map.

According to a further aspect of the present invention, a system is provided. In accordance with an example embodiment of the present invention, the system includes:
- an image detection device for detecting an input image;
- a preprocessing device that is implemented by the above device for providing a depth information image as a function of the input image; and
- a control unit for controlling at least one actuator of the system as a function of the depth information image.

BRIEF DESCRIPTION OF THE DRAWINGS

Specific embodiments are explained in greater detail below with reference to the figures

DETAILED DESCRIPTION OF EXAMPLE EMBODIMENTS

Figure 1:
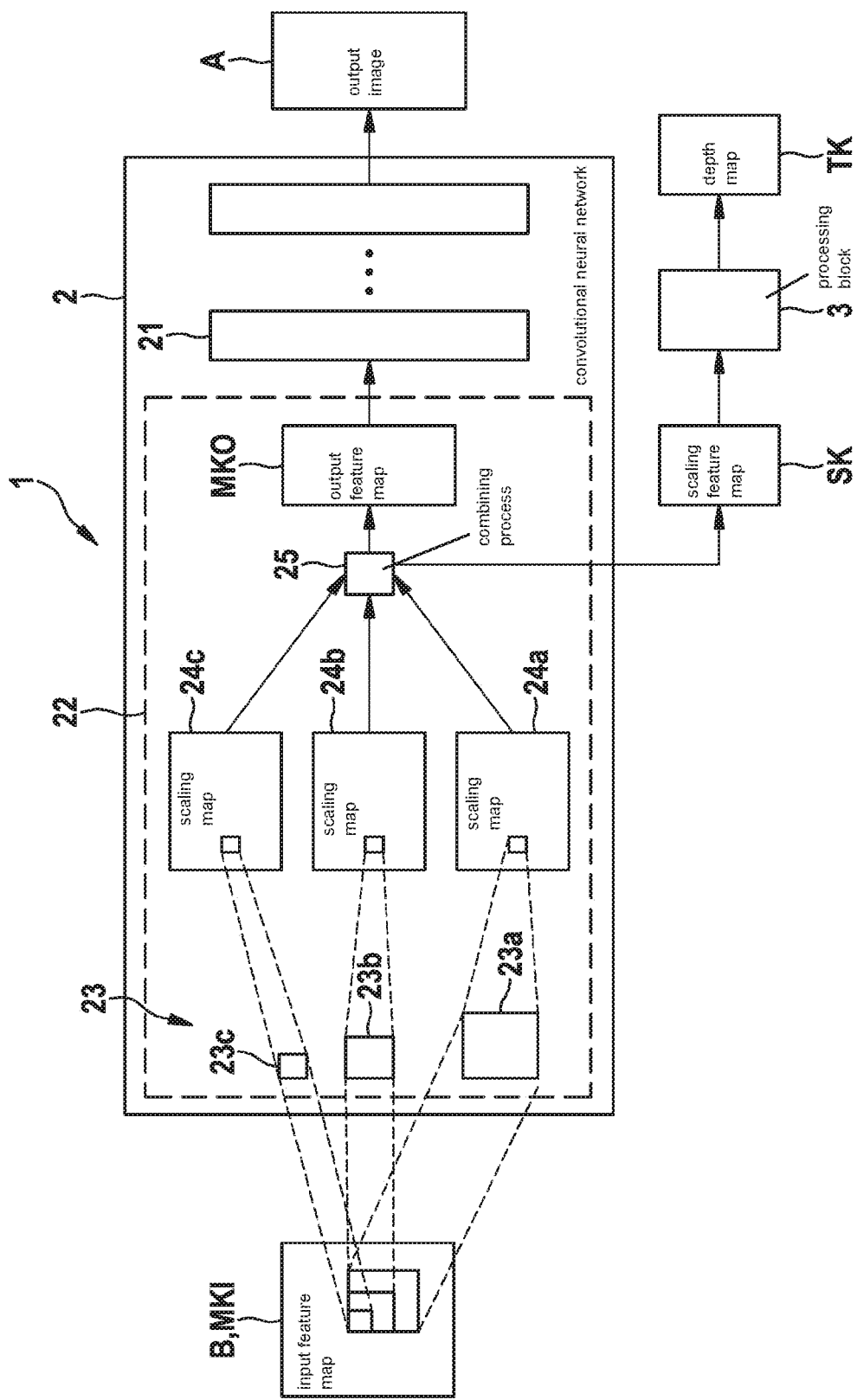
FIG. 1 shows a schematic illustration of an ascertainment of a segmented image, using a piece of depth information from an input image, in accordance with an example embodiment of the present invention.

FIG. 1 shows a schematic illustration of an image processing system 1 for carrying out a method for ascertaining a piece of depth information for an input image B, in the form of a depth information image, which is not stereoscopically provided. Image processing system 1 includes a processing device in which a first convolutional neural network 2 that includes multiple layers 21 is implemented.

A convolutional neural network is computed in a conventional manner by cascaded computation of feature maps. For this purpose, the convolutional neural network may include various types of computation layers, the layers including one or multiple convolution layers 21. In a convolution layer 21, a filter kernel is applied to a detail of an input feature map, which for the first computation layer may correspond to the input image, in order to generate an output feature map of the layer in question. The filter kernel corresponds to a convolution matrix that includes weighting values. A pixel of the output feature map is associated in each case with the image detail that is subject to the filter kernel at that moment, and the corresponding pixel value is computed via its inner product. The weighting values are multiplied by the corresponding pixel values of the detail of the input feature map, the results of all multiplications of a filter kernel being added to obtain the corresponding pixel value of the output feature map.

In multilayer convolutional neural networks, the output feature map is generally provided as an input feature map of a next computation layer, or, for the last computation layer, as an output image.

First neural network 2 of image processing system 1 provides multiple cascaded standard convolution layers 21 by way of example, in the illustrated exemplary embodiment a first layer being provided as depth map layer 22. In general, multiple of the first layers may be provided as depth map layers 22 in neural network 2. These may likewise be used in subsequent (deeper) layers, but typically these layers are designed as standard convolution layers 21.

Depth map layer 22 has an implementation that differs from the other layers of first convolutional neural network 2, in that the input feature map in question (input image B in the present case) is processed using multiple various scaling kernels 23.

Scaling kernels 23 correspond to a filter kernel of a convolution layer of convolutional neural network 2 which is provided in various scalings, so that multiple scaling kernels 23 are formed. These result by specifying largest scaling kernel 23a as the filter kernel with the largest number of weightings, and by downsampling the largest scaling kernel 23a in relation to the other scaling kernels 23b, 23c. The filter kernel assumed as largest scaling kernel 23a may be predefined, or may result from a training of convolutional neural network 2 with corresponding training data. The number of scaling kernels 23 per layer is arbitrarily selectable, but is preferably 2 to 10, more preferably 3 to 5.

Downsampling refers in general to the reduction in the supporting points of a time series or other arrangements of discrete values. In this case, the size of the matrix of the weighting values of the filter kernel is appropriately reduced by combining the weighting values.

In the simplest case, the "downsampling" corresponds to a matrix multiplication. In the process, a large filter X of a large scaling kernel is mapped onto a small filter Y:

$$Y = AXA^T$$

As an example of a downsampling of a 5×5×1 filter to a 3×3×1 filter:

$$A = \frac{1}{3}\begin{bmatrix} 3 & 0 & 0 \\ 2 & 1 & 0 \\ 0 & 3 & 0 \\ 0 & 1 & 2 \\ 0 & 0 & 3 \end{bmatrix}$$

Then, $$Y = A^T X A = \frac{1}{9}\begin{bmatrix} 3 & 2 & 0 & 0 & 0 \\ 0 & 1 & 3 & 1 & 0 \\ 0 & 0 & 0 & 2 & 3 \end{bmatrix}\begin{bmatrix} \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \end{bmatrix}\begin{bmatrix} 3 & 0 & 0 \\ 2 & 1 & 0 \\ 0 & 3 & 0 \\ 0 & 1 & 2 \\ 0 & 0 & 3 \end{bmatrix} = \begin{bmatrix} \# & \# & \# \\ \# & \# & \# \\ \# & \# & \# \end{bmatrix}$$

Y is optionally also multiplied by a freely selectable factor.

For a kernel having multiple (k) features, for example 5×5×k, this operation is carried out for each of the k features. In addition to the above method, the following methods may also be used in the downsampling method: nearest neighbors, cubic, bicubic, area interpolation, bilinear, or pooling.

As a result of the processing of input feature map MKI using multiple scaling kernels 23a, 23b, 23c, corresponding scaling maps 24a, 24b, 24c, associated with scaling kernels 23a, 23b, 23c, respectively, are ascertained by convolution. The processing takes place in the customary manner for convolutional neural networks, each pixel value of scaling map 24a, 24b, 24c being computed by applying associated scaling filter 23a, 23b, 23c to the corresponding detail of input feature map MKI.

Scaling maps 24a, 24b, 24c thus obtained are supplied to a combining process 25, which resembles a max pooling process. In the combining process, the particular maximum value of the pixel values is transferred into corresponding output feature map MKO by pixel-by-pixel comparison of scaling maps 24a, 24b, 24c. This output feature map MKO may now be used as an input feature map for the next layer of neural network 2, which may be a standard convolution layer 21 or a depth map layer 22, or, if the computing layer is a last layer of neural network 2, may correspond to output image A of the processing by neural network 2, for example a segmented image.

In combining process 25 for scaling maps 24a, 24b, 24c, in addition to the maximum pixel a piece of information is obtained concerning from which of scaling maps 24a, 24b, 24c the maximum pixel value (argmax function) has been computed. Scaling maps 24a, 24b, 24c are associated with corresponding scaling kernels 23a, 23b, 23c, and with scalings corresponding thereto, so that with the piece of information of scaling map 24a, 24b, 24c that is responsible for the maximum pixel value, a piece of information concerning the size/scaling of associated scaling kernel 23a, 23b, 23c is also present. The piece of information concerning scaling map 24 that delivers the maximum pixel value is written into scaling feature map SK, so that for each pixel of output feature map MKO in scaling feature map SK, a piece of information is present concerning which of scaling maps 24a, 24b, 24c or which size of scaling kernel 23a, 23b, 23c was responsible for the selection of the maximum pixel value in output feature map MKO.

Scaling feature map SK may be used directly as a depth map TK, or converted into depth map TK in a processing block 3. Depth map TK corresponds to a depth information image that indicates a distance of each individual pixel from the camera plane. Processing block 3 may correspond to a simple function block or to a trainable neural network.

Figure 2:
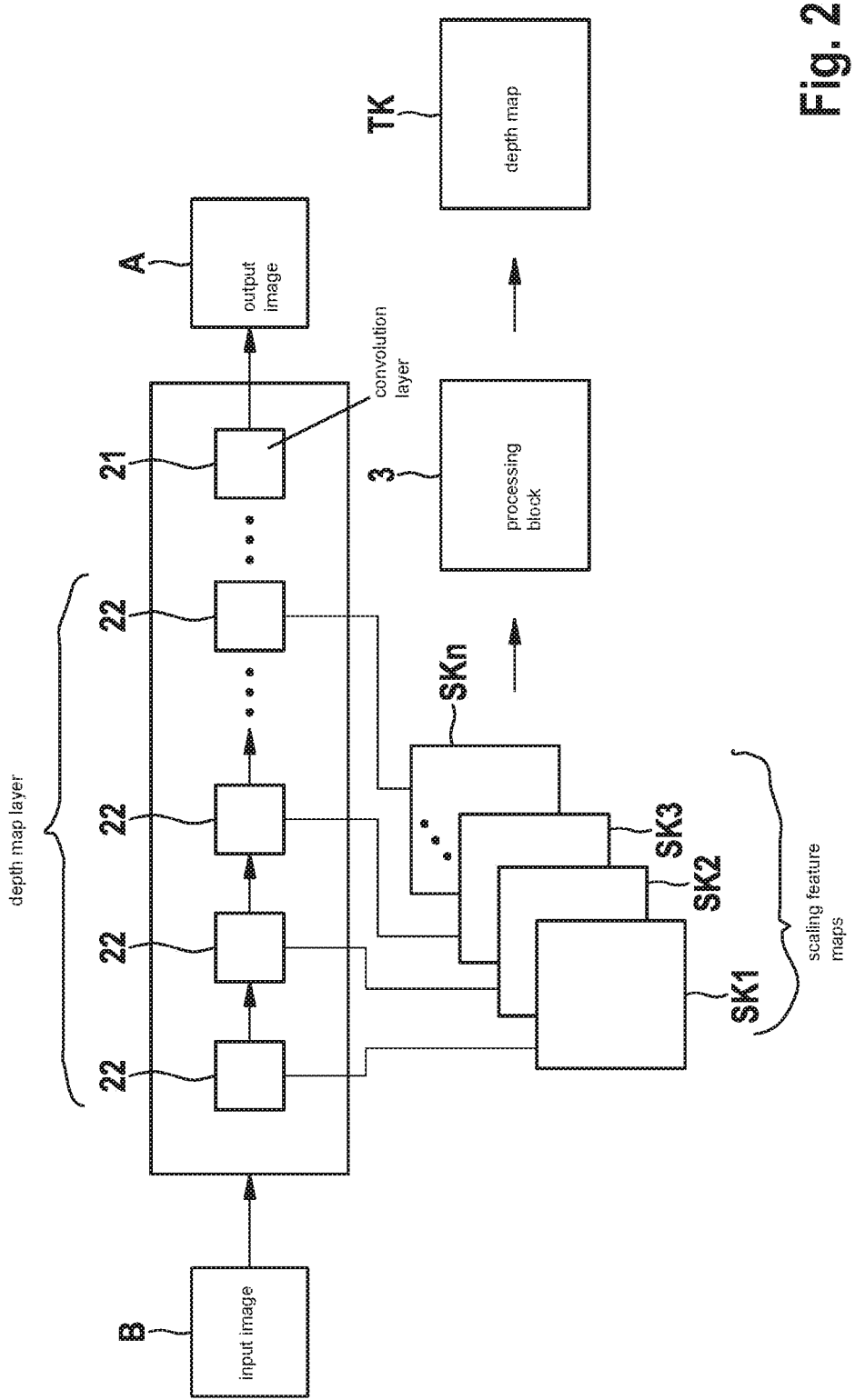
FIG. 2 shows a schematic illustration of the structure for obtaining a depth information image from multiple scaling feature maps in accordance with an example embodiment of the present invention.

Alternatively, as schematically illustrated in FIG. 2, multiple depth map layers 22 may be applied in a cascade in order to obtain multiple scaling feature maps SK1, SK2, SK3, SKn. Thus, for each input feature map MKI in question of depth map layers 22, in addition to particular output feature map MKO a corresponding scaling feature map SK is present. Multiple scaling feature maps SK1, SK2, SK3, . . . , SKn may be correspondingly processed in a processing block 3, designed as a further neural network, in order to obtain a depth map TK for segmented output image A, for example.

In addition, the processing in processing block 3, in addition to one or multiple scaling feature maps SK, SK1, SK2 . . . , SKn, may also process instantaneous output image A in order to obtain depth map TK.

Alternatively or additionally, the processing in neural network 2 may take into account one or multiple scaling feature maps SK, SK1, SK 2 . . . , SKn or a depth map TK ascertained therefrom in order to obtain instantaneous output image A.

Figure 4:
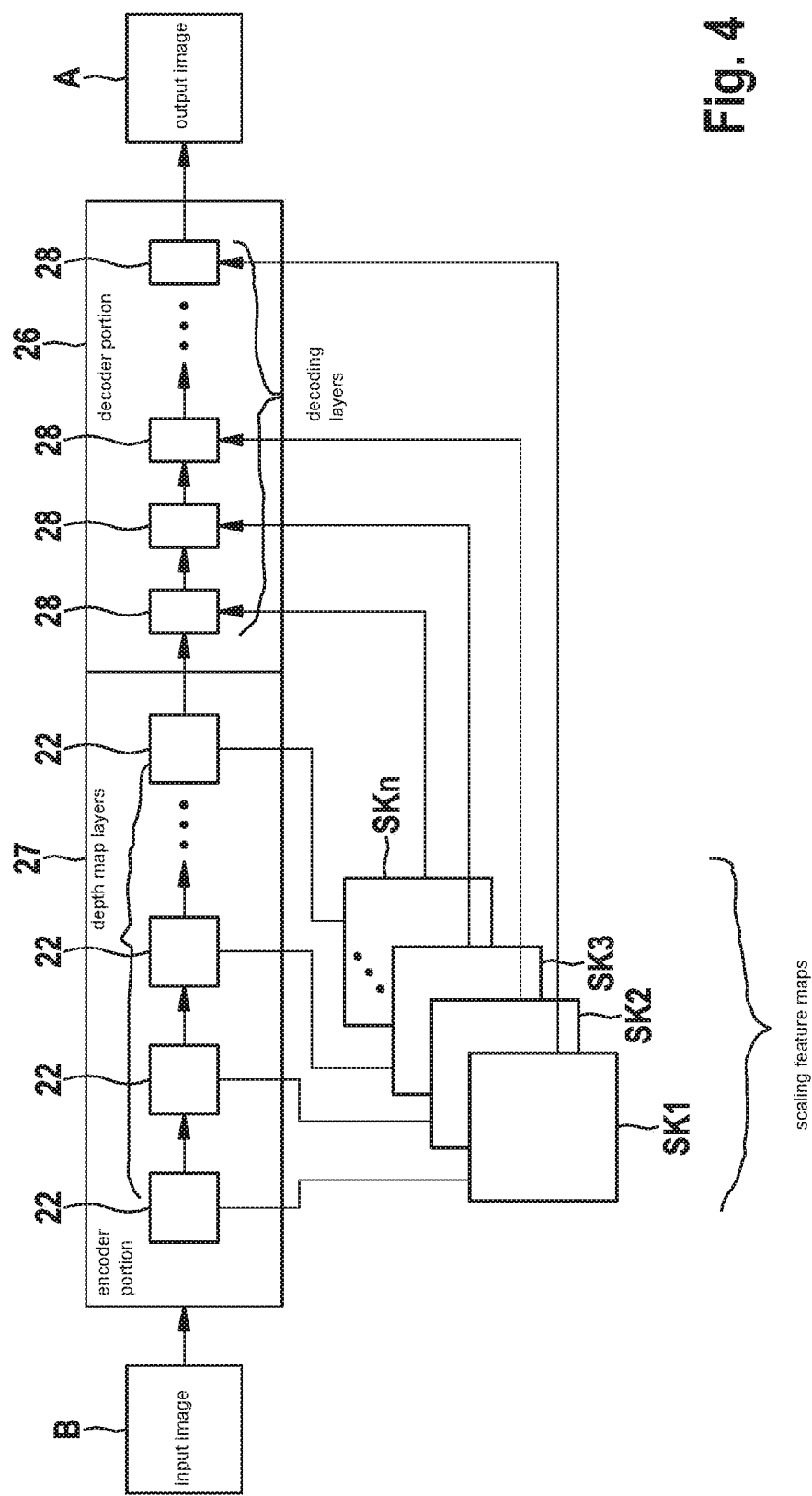
FIG. 4 shows a schematic illustration of the structure for obtaining a segmented output image from multiple scaling feature maps and with the aid of a neural network for semantic segmentation, in accordance with an example embodiment of the present invention.

Output image A may represent a segmented image in which the depth information of multiple scaling feature maps SK1, SK 2 . . . , SKn is processed. The output image may then represent a depth information image. For this purpose, as shown in FIG. 4 a neural network 2' may be used for the semantic segmentation, including an encoder portion 27 with depth map layers 22 and optionally further layers of a conventional convolutional neural network, and a decoder portion 26. Decoder portion 26 includes decoding layers 28 which process input image B, propagated by neural network 2', together with a respective scaling feature map SK1, SK2, SK3, . . . of depth map layer 22 in question of encoder portion 27. A segmented image based on neural network 2' and the additionally generated depth information of scaling maps 22 is obtained as the result. The illustrated combination of encoder portion 27 and decoder portion 26 forms a segmentation network as described, for example, in Hyeonwoo Noh et al., "Learning Deconvolution Network for Semantic Segmentation," Computer Vision and Pattern Recognition, https://arxiv.org/abs/1505.04366. The latent space between encoder portion 27 and decoder portion 26 (corresponding to an autoencoder network), formed by the configuration of the network, is used to reduce the data volume for describing the input image, the mapping in the latent space being interpreted by the decoder as a segmentation image.

Decoding layers 28 process scaling feature maps SK1, SK2 . . . , SKn by appending them on the input side to the particular input vector/input tensor of decoding layer 28 in question.

For training the image processing system of FIG. 1, neural network 2 and the further neural network of processing block 3 are trained and fixed in multiple stages and/or in alternation, since function argmax is not derivable, and therefore a backpropagation method cannot be used. For this reason, initially the filter kernels of neural network 2 are trained in the conventional manner with the aid of training images. Training images are now applied to neural network 2 in the above-described manner in order to obtain scaling feature map SK1, SK2, SK3, . . . SKn. For this purpose, training segmentation images are associated in each case with the training images so that the parameters of first neural network 2 may be trained.

The parameters thus trained are now fixed, and scaling kernels for the filter kernels of depth map layers 22 are correspondingly ascertained, for example with the aid of the above-described downsampling.

Based on the training images, training scaling feature maps SK1, SK2, SK3, . . . SKn, which are associated with the particular training image, are now ascertained with the aid of scaling kernels 23. With the aid of the training depth maps, which are associated with the training images and which provide depth information concerning the training images, second neural network 3 may now be trained. This is based on scaling feature maps SK1, SK2, SK3, . . . SKn, obtained during the input-side application of training images, and the predefined training depth map that is associated with the particular training image. For this purpose, second neural network 3 may likewise be designed as a conventional convolutional network.

Figure 3:
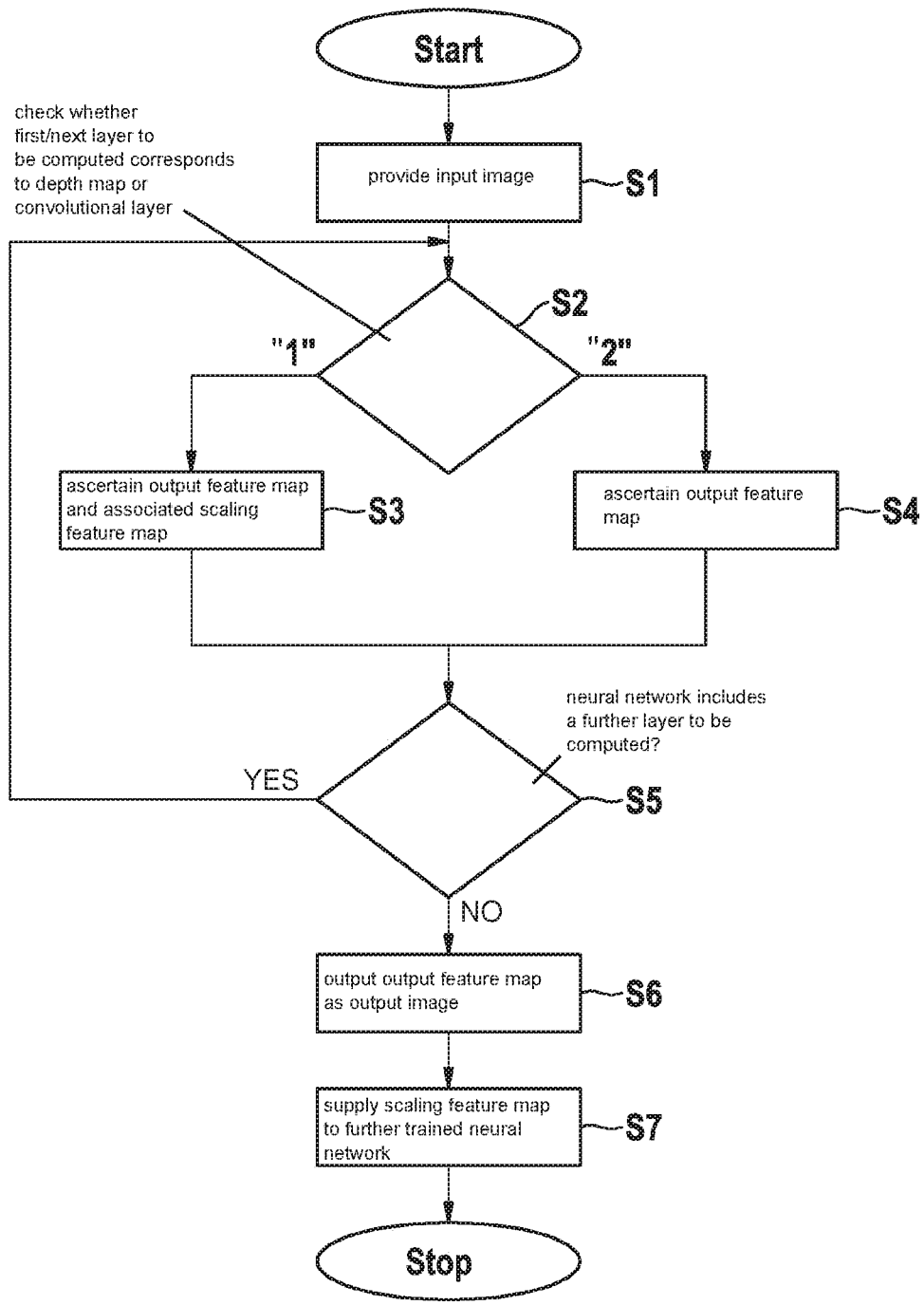
FIG. 3 shows a flow chart for illustrating a method for ascertaining a piece of depth information for objects in an input image to be examined that is not stereoscopically present, in accordance with an example embodiment of the present invention.

The method for ascertaining depth map TK is explained in greater detail below with reference to the flow chart of FIG. 3.

An input image B that is processed by predefined convolutional neural network 2, which is to be applied for ascertaining a segmented image, is provided in step S1.

According to the configuration of neural network 2, a check is made in step S2 as to whether the first/next layer to be computed corresponds to a depth map layer 22 or to a conventional layer 21 of neural network 2. If the next layer to be computed corresponds to a depth map layer (alternative: "1"), the method is continued with step S3; otherwise (alternative: "2"), the method is continued with step S4.

As described above, output feature map MKO, and at the same time associated scaling feature map SK, are ascertained based on multiple scaling filters 23, as described above, in step S3.

Corresponding output feature map MKO is ascertained, based on the function of conventional layer 21, in alternative step S4.

A check is made in step S5 as to whether neural network 2 includes a further layer to be computed. If this is the case (alternative: yes), output feature map MKO is assumed as the input feature map of the next layer and the method is continued with step S2. Otherwise, the method is continued with step S6.

Since no further computation steps are provided, the output feature map is output as output image A in step S6.

Previously obtained scaling feature map SK may be supplied to the further correspondingly trained neural network of processing block 3 in step S7 in order to determine depth map TK from scaling feature maps SK. Depth map TK then corresponds to the depth information image.

Depth information images may thus be determined from nonstereoscopic input images that are recorded by a camera of a technical system, in particular a robot, a vehicle, a tool, or a work machine.

Figure 5:
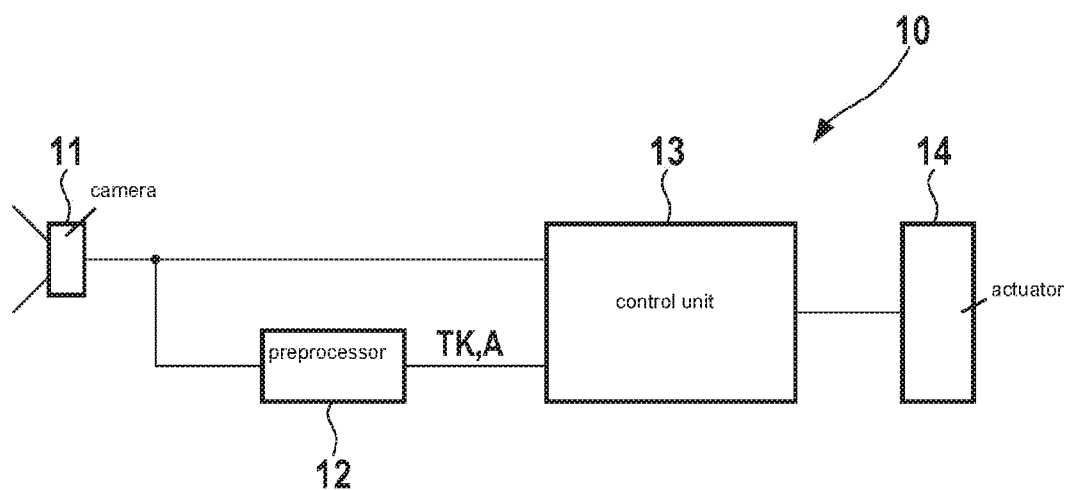
FIG. 5 shows a technical system that includes a camera for detecting an input image, a preprocessor, and a control unit for carrying out control functions.

FIG. 5 illustrates a technical system 10 that includes a camera 11 for detecting an input image, a preprocessor 12, and a control unit 13 for carrying out control functions. Preprocessor 12 carries out the above method for ascertaining a depth information image (depth map TK) and optionally an output image A, based on an input image that is detected by camera 11.

Control unit 13 implements functions of technical system 10 that require the depth information from camera images, but do not allow a stereoscopic detection of images. In addition to further input variables, control unit 13 optionally processes the depth information image for one or multiple output variables. As a function of the output variables of control unit 13, a processing unit controls at least one actuator 14 of the technical system with an appropriate control signal. For example, a movement of a robot or vehicle may thus be controlled, or a control of a drive unit or of a driver assistance system of a vehicle may take place.

What is claimed is:

1. A method for ascertaining a depth information image for an input image in order to control vehicle functions as a function of the depth information image, the method comprising:
processing the input image using a convolutional neural network, the convolutional neural network including multiple layers that sequentially process the input image and which each convert an input feature map into an output feature map, at least one of the layers is a depth map layer, the depth information image being ascertained as a function of a depth map layer;
wherein, in the depth map layer:
the input feature map of the depth map layer is convoluted with multiple scaling filters to obtain respective scaling maps,
the multiple scaling maps are compared pixel by pixel to generate a respective output feature map in which each pixel corresponds to a corresponding pixel from a selected one of the scaling maps, and
a scaling feature map is generated by associating each pixel of the scaling feature map with a piece of information that indicates the selected one of the scaling maps from which the pixel of the output feature map is selected;
wherein the depth information image corresponds to the scaling feature map or is determined as a function of the scaling feature map.

2. The method as recited in claim 1, wherein the selected one of scaling maps corresponds to a scaling map of the scaling maps that contains a largest pixel value for the pixel.

3. The method as recited in claim 2, wherein the scaling filters are determined from a filter kernel of the convolutional neural network by downsampling or upsampling.

4. The method as recited in claim 1, wherein multiple scaling feature maps are ascertained in multiple depth map layers, the depth information image being ascertained from the multiple scaling feature maps using a further neural network, the depth information image corresponding to a depth map.

5. The method as recited in claim 4, wherein the depth information image is ascertained from the multiple scaling feature maps and one or more output feature maps of one or multiple of the layers of the neural network and/or of an output image of the neural network.

6. The method as recited in claim 1, wherein the neural network generates an output image, at least one of the layers of the multiple layers generating an output feature map and/or the output image as a function of one or more of the scaling feature maps, the one or more of the scaling feature maps of the input feature map supplied to the at least one of the layers of the multiple layers.

7. The method as recited in claim 6, wherein the output image and the depth information image are processed together in a downstream additional neural network.

8. The method as recited in claim 1, further comprising:
using the depth information image to control a vehicle function that relates to:
(i) a fully autonomous or semiautonomous driving operation, or (ii) a driver assistance function for warning of objects in surroundings.

9. A device for ascertaining a depth information image for an input image in order to control vehicle functions as a function of the depth information image, the device configured to:
process the input image using a convolutional neural network, the convolutional neural network including multiple layers that sequentially process the input image and which each convert an input feature map into an output feature map, at least one of the layers being a depth map layer, the depth information image being ascertained as a function of a depth map layer;
wherein, for the at least one depth map layer, the device being configured to:
convolute an input feature map of the depth map layer with multiple scaling filters to obtain respective scaling maps,
compare the multiple scaling maps pixel by pixel to generate a respective output feature map in which each pixel corresponds to a corresponding pixel from a selected one of the scaling maps, and
generate a scaling feature map by associating each pixel of the scaling feature map with a piece of information that indicates the selected one of the scaling maps from which the pixel of the output feature map is selected;
wherein the depth information image corresponds to the scaling feature map or is determined as a function of the scaling feature map.

10. A system, comprising;
an image detection device configured to detect an input image;
a preprocessing device for providing a depth information image as a function of the input image, the preprocessing device configured to:
process the input image using a convolutional neural network, the convolutional neural network including multiple layers that sequentially process the input image and which each convert an input feature map into an output feature map, at least one of the layers being a depth map layer, the depth information image being ascertained as a function of a depth map layer;
wherein, for the at least one depth map layer, the device being configured to:
convolute an input feature map of the depth map layer with multiple scaling filters to obtain respective scaling maps,
compare the multiple scaling maps pixel by pixel to generate a respective output feature map in which each pixel corresponds to a corresponding pixel from a selected one of the scaling maps, and
generate a scaling feature map by associating each pixel of the scaling feature map with a piece of information that indicates the selected one of the scaling maps from which the pixel of the output feature map is selected;
wherein the depth information image corresponds to the scaling feature map or is determined as a function of the scaling feature map; and
a control unit configured to control at least one actuator of the system as a function of the depth information image.

11. An non-transitory electronic memory medium on which is stored a computer program for ascertaining a depth information image for an input image in order to control vehicle functions as a function of the depth information image, the computer program, when executed by a computer, causing the computer to perform the following:
processing the input image using a convolutional neural network, the convolutional neural network including multiple layers that sequentially process the input image and which each convert an input feature map into an output feature map, at least one of the layers is a depth map layer, the depth information image being ascertained as a function of a depth map layer;
wherein, in the depth map layer:
the input feature map of the depth map layer is convoluted with multiple scaling filters to obtain respective scaling maps,
the multiple scaling maps are compared pixel by pixel to generate a respective output feature map in which each pixel corresponds to a corresponding pixel from a selected one of the scaling maps, and
a scaling feature map is generated by associating each pixel of the scaling feature map with a piece of information that indicates the selected one of the scaling maps from which the pixel of the output feature map is selected;
wherein the depth information image corresponds to the scaling feature map or is determined as a function of the scaling feature map.

\* \* \* \* \*